United States Patent
Kiwalle et al.

[15] 3,659,771
[45] May 2, 1972

[54] RAPID ACCELERATION MECHANISM FOR FRICTION WELDER

[72] Inventors: Jozef Kiwalle; Ira H. Sage, both of Peoria, Ill.

[73] Assignee: Caterpillar Tractor Co., Peoria, Ill.

[22] Filed: Nov. 2, 1970

[21] Appl. No.: 85,854

[52] U.S. Cl. ..................................228/2, 29/470.3, 60/53 R, 156/73, 228/2
[51] Int. Cl. .......................................................B23k 27/00
[58] Field of Search ...............60/53 R, 52.5 R, 97 E; 91/412; 228/2; 29/470.3; 156/73

[56] References Cited

UNITED STATES PATENTS

| | | | |
|---|---|---|---|
| 3,235,158 | 2/1966 | Hollander | 228/2 |
| 3,269,002 | 8/1966 | Hollander et al. | 228/2 X |
| 3,591,068 | 7/1971 | Farmer et al. | 228/2 |

Primary Examiner—John F. Campbell
Assistant Examiner—R. J. Craig
Attorney—Fryer, Tjensvold, Feix, Phillips & Lempio

[57] ABSTRACT

A rapid acceleration mechanism is provided for a friction welder having a fixed displacement fluid pump. The pump is operatively interconnected with the two fluid motors so that both motors drive the welder spindle during the early portion of the acceleration cycle and only one of the motors drives the spindle after the speed of the two motors approaches the maximum output of the pump. Replaceable change gears are provided for the drive train of the welder to provide acceleration and total speed flexibility for the drive system.

4 Claims, 3 Drawing Figures

Patented May 2, 1972

INVENTORS
JOZEF KIWALLE
IRA H. SAGE

BY
Fryer, Tjensvold, Feix, Phillips & Lempio
ATTORNEYS

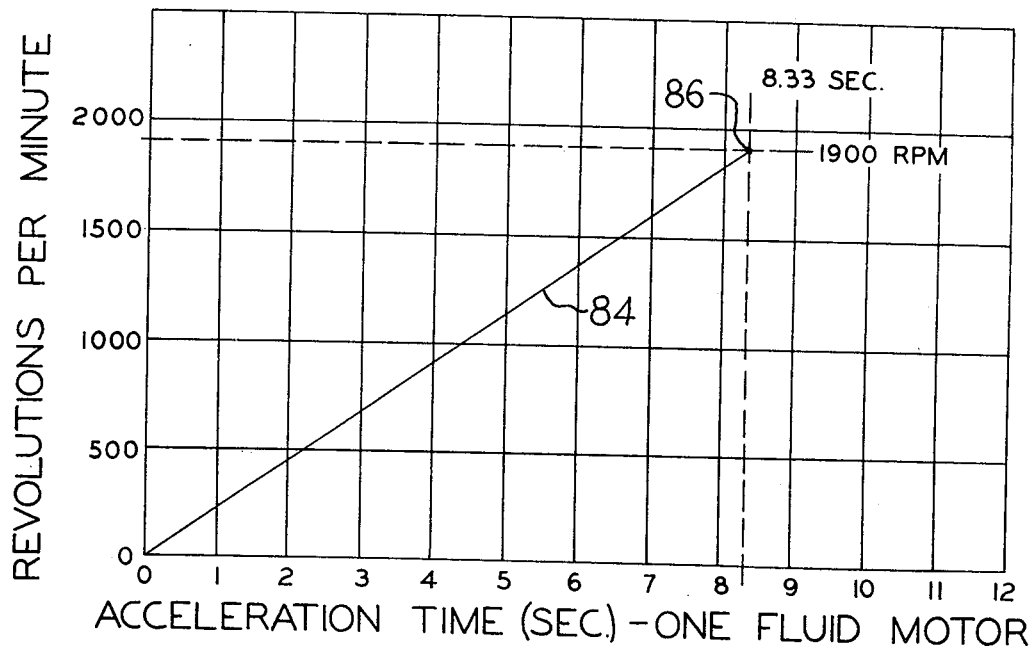
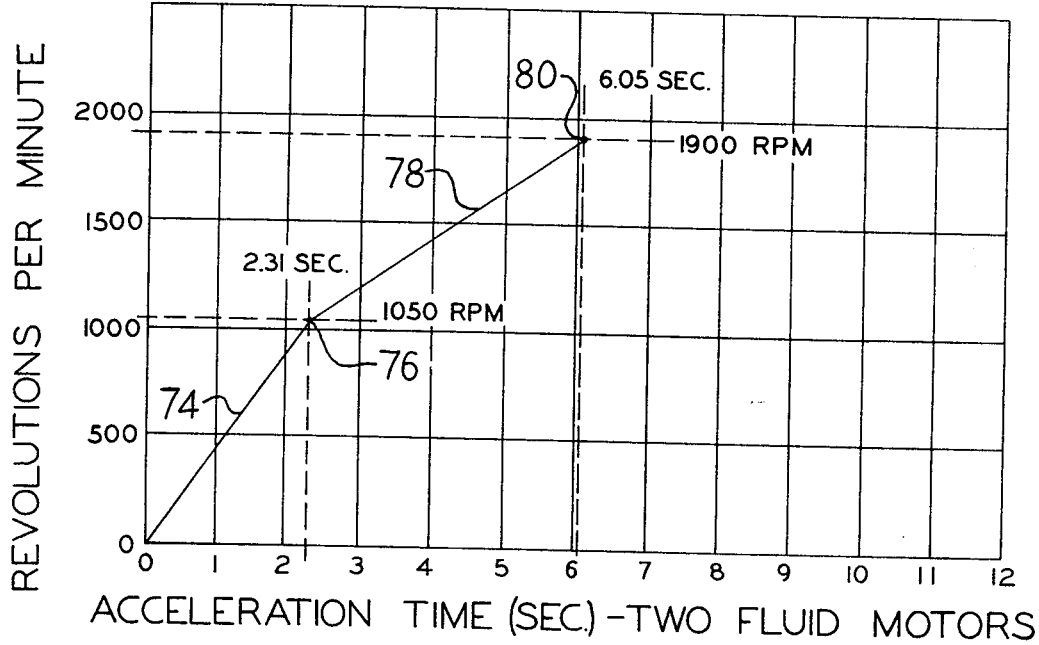

RAPID ACCELERATION MECHANISM FOR FRICTION WELDER

BACKGROUND OF THE INVENTION

This invention relates to a rapid acceleration drive mechanism for the rotatable spindle of a friction welding machine. More particularly the invention relates to a rapid acceleration drive mechanism for a friction welder spindle wherein a relatively small fluid displacement pump is operatively interconnected with two fluid motors so that both motors drive the spindle during the early portion of the acceleration cycle and only one motor drives the spindle after the speed of the two motors approaches the maximum output of the pump.

In recent years friction welding machines have been used extensively in large scale production operations for the welding together of various parts. The unit time for each weld is of prime concern in any such large scale production operation. Obviously, the shorter the total time required in any given large scale friction welding operation the greater the total output. However, the economics involved in shortening the total welding time reach a point of diminishing return when the cost involved in modifying the welding machine to achieve a shorter weld time approaches the added profits derived from larger production. Thus, the problem is one of achieving the shortest weld time without making expensive modifications to the friction welding machine.

In friction welding operations, a large portion of the weld cycle time is consumed in accelerating the rotatable workpiece from a stopped position up to the welding velocity. This acceleration time period increases as the size of the rotating workpiece increases since larger parts require larger flywheels for supplying the required weld energy to the rotating spindle system. Additionally, the very early stages of the acceleration time period expend a large share of the total acceleration time due to the inherent inertia of the spindle system, which is initially at rest.

The present invention provides a rapid acceleration drive mechanism for the rotatable spindle of a friction welding machine without extensively increasing the size or number of components associated with conventional friction welding machines.

A specific object of the invention is the provision of a rapid acceleration mechanism which incorporates two fluid motors and a relatively small hydraulic pump for sequentially driving both the motors early in the acceleration cycle and then driving only one of the motors later in the acceleration cycle to substantially reduce the overall time required to bring the rotating spindle of the welder up to welding velocity.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENT

Figure 1:
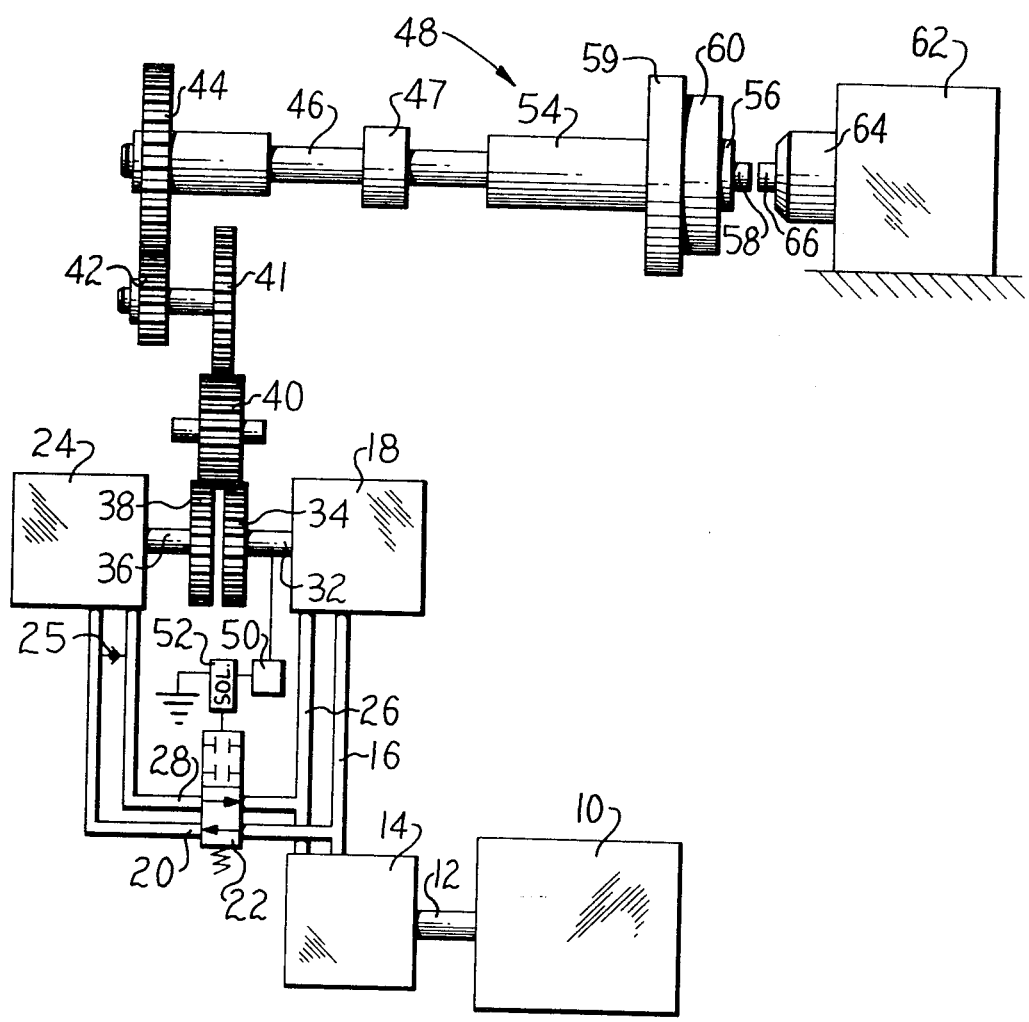
FIG. 1 is an overall schematic view, partially in section, illustrating a preferred embodiment of the invention; and, FIGS. 2 and 3 are graphic representations illustrating the advantages of the invention.

FIG. 1 illustrates a schematic representation of a friction welding machine constructed in accordance with the present invention. As shown in FIG. 1 the welding machine comprises an electric motor 10 having an output shaft 12 which drives a relatively small fixed displacement fluid pump 14. A fluid supply conduit 16 supplies fluid from the pump 14 to a first or primary motor 18. A branch conduit 20 supplies fluid from pump 14 through a two-way valve 22 to a secondary motor 24. Fluid return conduits 26 and 28 return fluid from the respective motors 18 and 24 to the pump 14.

The motor 18 has a drive shaft 32 which is provided with a drive gear 34. Similarly the motor 24 has a drive shaft 36 which is provided with a drive gear 38. Both drive gears 34 and 38 are in mesh with an idler gear 40 which forms a part of a drive system, comprising a second idler gear 41, replaceable change gears 42 and 44, main shaft 46, disconnect mechanism 47, and a spindle assembly 48.

It should be noted that a speed sensing switch 50 is associated with the motor shaft 32. When the shaft 32 reaches a predetermined r.p.m. value, which corresponds to the maximum quantity of fluid which the pump 14 can simultaneously supply to both motors 18 and 24, the switch 50 moves to a position which activates a solenoid 52 and the valve 22 is thereby moved to a closed position. When the valve 22 is in the closed position the pump 14 only drives the motor 18 and has sufficient capacity to drive the motor 18 up to the required spindle speed for performing a given welding operation. Since motor 24 will continue to rotate, but will be supplied with no fluid from pump 14, a one-way check valve 25 is provided between lines 28 and 20 to allow fluid trapped in the motor and lines to circulate through the motor 24.

The spindle assembly 48 includes a spindle 54 which is provided with a collet chuck 56 for firmly holding a workpiece 58. The spindle 54 is also provided with one or more annular flywheel such as shown at 59 and 60 depending upon the size of the workpieces which are to be welded. The welding machine also includes a tailstock assembly 62 which has a non-rotatable chuck or holding member 64 for securely holding a second workpiece 66.

A typical welding operation for joining the workpiece 58 to the workpiece 66 would be performed as follows. Using standard procedures, the correct welding energy may be determined for the particular cross-sectional area and the material comprising the workpieces 58 and 66. The welding energy is a function of speed and flywheel mass and therefore a correct relationship between speed and flywheel mass may be calculated. The appropriate flywheels, such as 59 and 60, are then placed on the machine and the workpieces 58 and 66 are securely clamped in their respective rotating and non-rotating holding fixtures.

In order to accelerate the spindle assembly 48 having the flywheels 59 and 60 to the appropriate specific welding velocity an appropriate set of change gears 42 and 44 must be provided in the drive system. For a different size of workpieces or for workpieces of different material, a different flywheel system and welding velocity, and consequently a different set of change gears 42 and 44 would be used. The purpose of the change gears 42 and 44 in the mechanical transmission assembly is to provide what is considered an optimum acceleration rate for a given flywheel system and to broaden the speed range obtainable with a fixed displacement pump 14 and motors 18 and 24 of a given size.

After the appropriate change gears 42 and 44 have been placed in the mechanical transmission the electric motor 10 is energized which rotates the pump 14 so that fluid under pressure is supplied to the two fluid motors 18 and 24 causing them to rotate. The fluid motor gears 34 and 38 will then cause rotation of the idler gears 40 and 41 which in turn rotate the change gears 42 and 44. This rotary motion is then transferred to the shaft 46 and ultimately to the workpiece 58 held in the chuck 56 at the end of the spindle assembly 48.

During the early part of the acceleration cycle both of the motors 18 and 24 supply power through the gear train to the spindle assembly 48. However, the fixed displacement fluid pump 14 reaches maximum capacity after the motors 18 and 24 reach a certain r.p.m. valve. This r.p.m. value may be predetermined and a speed sensing switch 50 which is associated with the motor shaft 32 will then be operable to activate a solenoid 52 which closes the valve 22 and thereafter the pump 14 only drives the motor 18.

The motor 18 then drives the spindle assembly 48 up to a predetermined and preset welding velocity at which time the electric motor 10 is de-energized by conventional means which are not shown in the drawing. At this juncture, the shaft 46 is automatically decoupled from the spindle assembly 48 by means of a disconnect assembly 47 which may take the form of a one-way overrunning clutch.

The spindle assembly 48 will continue to rotate and thrust cylinders (not shown) connected to either the spindle 48 or the tailstock 62 are activated which forces the two workpieces 58 and 66 into contact under high pressure. The workpieces 58 and 66 are quickly heated to the welding temperature due to the friction from the relative motion and the applied thrust pressure and the weld is completed as all of the energy of the rotating spindle assembly is transferred to the interface of the workpieces. After the weld is completed the workpiece holding members can be loosened and the complete welded assembly may be removed from the machine and new workpieces may be inserted therein preparatory to repeating the weld cycle.

Assuming that the welding process just described required a welding velocity of 1,900 r.p.m. with a specific flywheel mass, the rate of acceleration in seconds can be plotted against the revolutions per minute. A graph showing this relationship is shown in FIG. 2. In FIG. 2 the line 74 leading to the point 76 and the line 78 leading to the point 80 represents the acceleration of the spindle and flywheel assembly up to the welding velocity. As can be seen from the graph of FIG. 2 the point 80 represents the desired welding velocity of 1,900 r.p.m. and represents a total acceleration time of 6.05 seconds.

FIG. 3 represents a graph which can be used for comparing the acceleration time of an identical welding operation as that shown in FIG. 2 except that only one of the motors 18 or 24 is used in combination with the fixed displacement pump 14. Except for the use of one rather than two of the motors 18 or 24 the same mechanical components as are shown in FIG. 1 are used in establishing the data for the graph shown in FIG. 3. In FIG. 3 the line 84 represents the acceleration of the spindle and flywheel assembly up to the welding velocity. As can be seen from the chart of FIG. 3 the point 86 represents the desired welding velocity of 1,900 r.p.m. and represents a total acceleration time of 8.33 seconds.

By comparing FIG. 2 with FIG. 3 it will be noted that the slope of the acceleration lines 74 and 78 of FIG. 2 has been changed when compared with the slope of the acceleration line 84 shown in FIG. 3. In FIG. 2 the slope of the acceleration line 74 up to the point 76 is considerably greater than the slope of the acceleration line 84 in FIG. 3. The steeper slope of the acceleration line 74 in FIG. 2 represents that portion of the acceleration cycle when both the motors 18 and 24 are transmitting power to the drive system of the welding machine.

By comparing the overall total acceleration time shown in FIG. 2 with that shown in FIG. 3 it may be observed that the acceleration time to reach 1,900 r.p.m. in FIG. 2 has been shortened over that shown in FIG. 3 by more than 2.25 seconds which represents approximately a 27 percent faster acceleration rate. Thus, by properly combining the two motors 18 and 24 with the fixed displacement fluid pump 14 so that both motors operate during the early portion of the acceleration cycle, the unit time for each weld may be considerably reduced to produce a substantial economic savings in large scale welding operations without making complicated or expensive modifications to the friction welding machine.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is

1. A rapid acceleration drive mechanism for a friction welding machine having a rotatable spindle and workpiece holding chuck associated therewith, said drive mechanism comprising; an electric motor; a fixed displacement fluid pump driven by the electric motor; a pair of fluid motors operatively connected to the pump, said pump having a total capacity capable of driving only one of the fluid motors at maximum speed; a gear train interconnecting the fluid motors with the rotatable spindle of the friction welding machine; each of said fluid motors having a drive gear in meshing relation with a common gear associated with the drive train; and, means for disconnecting one of the motors from the pump when the speed of the motors approaches the maximum output of the pump.

2. The invention of claim 1 wherein the disconnect means includes a speed sensing mechanism.

3. The invention of claim 2 further including a normally open valve means for communicating fluid from the pump to one of the motors, said speed sensing mechanism operable to close the valve means after the motors have reached a predetermined speed.

4. The invention of claim 1 wherein said gear train comprises replaceable change gears for changing the maximum spindle speed and for optimizing the acceleration time obtainable with the fixed displacement fluid pump.

* * * * *